United States Patent
Tang et al.

(10) Patent No.: US 11,323,333 B2
(45) Date of Patent: May 3, 2022

(54) POWER OPTICAL TRANSMISSION ROUTE AND SPECTRUM ALLOCATION METHOD BASED ON ELASTIC OPTICAL NETWORK

(71) Applicants: State Grid Fujian Electric Power Co., Ltd., Fujian (CN); State Grid Fujian Economic Research Institute, Fujian (CN)

(72) Inventors: Yuanchun Tang, Fujian (CN); Bingsen Xia, Fujian (CN); Duanyun Chen, Fujian (CN); Wenqin Lin, Fujian (CN); Hongyang Lin, Fujian (CN)

(73) Assignees: State Grid Fujian Electric Power Co., Ltd., Fuzhou (CN); State Grid Fujian Economic Research Institute, Fuzhou (CN)

( * ) Notice: Subject to any disclaimer, the term of this patent is extended or adjusted under 35 U.S.C. 154(b) by 0 days.

(21) Appl. No.: 16/973,787

(22) PCT Filed: Sep. 4, 2020

(86) PCT No.: PCT/CN2020/113454
§ 371 (c)(1),
(2) Date: Dec. 10, 2020

(87) PCT Pub. No.: WO2021/018316
PCT Pub. Date: Feb. 4, 2021

(65) Prior Publication Data
US 2021/0168040 A1 Jun. 3, 2021

(51) Int. Cl.
*H04J 14/00* (2006.01)
*H04L 41/142* (2022.01)
(Continued)

(52) U.S. Cl.
CPC ............. *H04L 41/142* (2013.01); *H04B 3/54* (2013.01); *H04B 10/25* (2013.01); *H04L 47/122* (2013.01)

(58) Field of Classification Search
CPC ... H04L 41/142; H04L 47/122; H04L 45/122; H04L 45/22; H04L 47/125; H04B 3/54;
(Continued)

(56) References Cited

U.S. PATENT DOCUMENTS 10,542,335 B2 * 1/2020 Fujisawa ............. H04J 14/0257
11,121,775 B2 * 9/2021 Shen ...................... H04B 10/25
(Continued)

FOREIGN PATENT DOCUMENTS

CN 101437273 A * 5/2009

*Primary Examiner* — Hibret A Woldekidan

(57) ABSTRACT

Disclosed is a power optical transmission route and spectrum allocation method based on an elastic optical network, including: determining a set of alternative routes among nodes of a power communication network according to power communication topology; coloring the routes for classification, determining a total number of colors allocated, and determining the coloring of the set of alternative routes according to a hop count of route nodes and the total number of colors of spectrums; proportionally classifying the spectrums into blocks according to the total number of colors allocated and the number of route classes allocated to each color; selecting an optimal solution from the set of alternative routes by comprehensively considering a switching hop count and a network-wide risk balance value, to determine a route to execute service allocation; and determining positions of spectrum blocks according to the route selected and the allocated colors, to complete spectrum allocation.

3 Claims, 5 Drawing Sheets

(51) Int. Cl.
*H04B 3/54* (2006.01)
*H04B 10/25* (2013.01)
*H04L 47/122* (2022.01)

(58) Field of Classification Search
CPC .... H04B 10/25; H04B 10/27; H04B 10/2939; H04J 14/0271; H04J 14/0284
USPC .................................. 398/45, 49, 57, 25, 38
See application file for complete search history.

(56) References Cited

U.S. PATENT DOCUMENTS

| | | | |
|---|---|---|---|
| 2017/0046301 A1* | 2/2017 | Walker ................ | H04L 43/0823 |
| 2017/0048134 A1* | 2/2017 | Bruno ................... | H04B 10/27 |
| 2017/0078044 A1* | 3/2017 | Hino .................... | H04B 10/548 |
| 2017/0353239 A1* | 12/2017 | Takita ................. | H04J 14/0212 |
| 2019/0037288 A1* | 1/2019 | Fujisawa ............ | H04Q 11/0005 |
| 2020/0136743 A1* | 4/2020 | Fujisawa ............ | H04Q 11/0062 |
| 2020/0296485 A1* | 9/2020 | Wang ...................... | H04L 45/64 |
| 2021/0281350 A1* | 9/2021 | Shahriar ............ | H04Q 11/0062 |

* cited by examiner

POWER OPTICAL TRANSMISSION ROUTE AND SPECTRUM ALLOCATION METHOD BASED ON ELASTIC OPTICAL NETWORK

FIELD

The present disclosure relates to the field of power communication network technologies, and more particular, to a power optical transmission route and spectrum allocation method based on an elastic optical network.

BACKGROUND

With the gradual deployment and promotion of the energy Internet, the interaction between the power source, the power grid and the load becomes more frequently, production and management services carried by a power communication network may be progressively increased, and new applications such as high-definition video distribution and cloud services are on the rise. Increase of power network information services leads to an increase in a demand for bandwidth, while fiber cores of part of trunk optical cable are close to saturation, and there is a bottleneck segment of local fiber cores in the network, which cannot meet requirements of a new communication circuit. With the increasing richness of service requirements and the increasing complexity of network topology, load imbalance in the power communication network becomes increasingly prominent. Some core nodes or important links carry a large amount of service data, which not only increases network vulnerability, but also leads to bottleneck links, leading to relatively low resource utilization.

On the other hand, fracture failure cases of electric optical cables are common. Due to typical industry particularity of power network services, once optical fibers in the power communication network fractures and fails, this may have a great impact on safe production and stable operation of a power system. Therefore, there is a need to optimize the routing of power communication services, so as to reduce operational risks of the power communication network and improve its reliability and throughput.

At present, sudden congestion is no longer the root of a service communication risk, and over-concentration of services on several paths is a new source of risk. A conventional routing algorithm cannot avoid such a risk, which makes it a new problem faced by the study of availability of a power communication network. Service routing is an important determinant of a communication risk. However, an existing routing algorithm fails to take into account the particularity of the power communication services, which may lead to unbalanced service distribution in channel segments and further increase the overall risk of the channel segments and the network.

SUMMARY

In view of this, an objective of the present disclosure is to provide a power optical transmission route and spectrum allocation method based on an elastic optical network, to solve the problems of uneven distribution of risks of a power communication network and spectrum fragmentation in the prior art and achieve effects of comprehensively considering routes and spectrums, balancing a switching hop count and risk balance degrees, and improving resource utilization.

The present disclosure is implemented by using the following solution: a power optical transmission route and spectrum allocation method based on an elastic optical network, which can obtain, in route selection and calculation, a set of alternative routes according to a hop count index; and determine coloring the set of alternative routes according to a hop count of route nodes and the total number of colors of spectrums, thereby reducing a network-wide risk balance degree and achieving a better spectrum allocation effect. Then, the network-wide risk balance degree is calculated, and a route is selected from the set of alternative routes by comprehensively considering a hop count of route nodes and the network-wide risk balance degree, to complete spectrum allocation.

The method particularly includes the following steps:

determining a set of alternative routes among nodes of a power communication network according to power communication topology;

coloring the routes for classification, determining a total number of colors allocated, and determining the coloring of the set of alternative routes according to a hop count of route nodes and the total number of colors of spectrums, so as to reduce a network-wide risk balance degree;

proportionally classifying the spectrums into blocks according to the total number of colors allocated and the number of route classes allocated to each color;

selecting, according to a to-be-transmitted power communication service, an optimal solution from the set of alternative routes by comprehensively considering a switching hop count and a network-wide risk balance value, to determine a route to execute service allocation; and determining positions of spectrum blocks according to the route selected and the allocated colors, to complete spectrum allocation.

Further, the determining a set of alternative routes among nodes of a power communication network according to power communication topology is particularly:

obtaining an undirected graph $G=(V,E)$ according to topology of the power communication network, where V denotes a point set $V=\{v_1, v_2, v_3, \ldots, v_N\}$ of the power communication network, and E denotes an edge set $E=\{e_1, e_2, e_3, \ldots, e_m\}$ of the power communication network;

determining a switching hop count CAPEX of the $i^{th}$ route according to the point set and the edge set of the power communication network and the following formula:

$$CAPEX(i) = \sum^V p_i$$

in the formula, p denotes the number of nodes that the route passes through; and determining a set of alternative routes of the $i^{th}$ node pair of the power communication network according to a switching hop count CAPEX. In particular, the set of alternative routes can be obtained according to a classical ksp, i.e. first k shortest paths, algorithm, by comparing a switching hop count to a link weight index.

Further, the determining the coloring of the set of alternative routes according to a hop count of route nodes and the total number of colors of spectrums, so as to reduce a network-wide risk balance degree is particularly:

establishing the following objective function according to a principle that the same links are in different colors or different links are in the same color:

$$\text{Min } Q = CAPEX + N;$$

in the formula, N is the total number of spectrum colors, Q is an optimal balance number; and CAPEX is a switching hop count of the route;

constraint conditions are:

$$\sum_{o \in O} x_v^o = 1, \quad \forall v \in V_1;$$

$$x_v^o + x_{v'}^o \leq y_o, \quad \forall (v, v') \in E_1, \quad \forall o \in O;$$

$$y_o \geq y_{o'}, \text{ if } o' \geq o, \quad \forall o', o \in O;$$

$$y_o = \{0, 1\}, \quad \forall o \in O;$$

$$x_v^o = \{0, 1\}, \quad \forall v \in V_1, \quad \forall o \in O;$$

$$N = \sum_{o \in O} y_o;$$

in the formula, p denotes the number of nodes that the route passes through, $V_1$ denotes a set of alternative routes in network topology, $E_1$ denotes a set of connection lines, O denotes a set of colors, o and o' denote a color respectively, and v and v' denote one of the route sets respectively; $x_v^o$ and $y_o$ are binary quantities respectively indicating whether a route uses a color, if the point v uses the color o, $x_v^o=1$, and otherwise $x_v^o=0$; and if the color o has been used at least once, $y_o=1$, and otherwise, $y_o=0$.

Further, the proportionally classifying the spectrums into blocks according to the total number of colors allocated and the number of route classes allocated to each color is particularly:

determining a size of a spectrum block St(o) allocated to the $o^{th}$ color according to the following formula:

$$St(o) = \text{ratio}(o) \times \text{num};$$

in the formula, num denotes the total number of spectrum grids, and ratio(o) denotes a ratio of the $o^{th}$ color; and classifying the spectrums into blocks according to a size ratio of the spectrum block allocated to each color.

Further, the selecting, according to a to-be-transmitted power communication service, an optimal solution from the set of alternative routes by comprehensively considering a switching hop count and a network-wide risk balance value is particularly:

selecting, according to the following objective function, the optimal solution from the set of alternative routes, and then determining the route to execute service allocation:

$$\text{Min } M = CAPEX + R_e;$$

constraint functions are:

$$CAPEX = \sum^V p;$$

$$R(i, j) = n \times \frac{FS_{ij} - FS_{ij}^{idle}}{FS_{ij}} \times im;$$

$$\mu = \frac{1}{S} \sum R(i, j);$$

$$R_e = \sqrt{\frac{1}{S} \sum [R(i, j) - \mu]^2};$$

in the formula, M denotes an integrated optimization goal, CAPEX denotes a switching hop count of the $i^{th}$ route, V denotes a point set of the power communication network, im represents an initial failure rate probability, n represents service importance, p represents the number of nodes that the route passes through, R(i,j) represents an integrated risk value, N represents a variety of colors, S represents a set of network-side links, $FS_{ij}$ denotes the total number of spectrum grids on a link ij, $FS_{ij}^{idle}$ represents the number of idle spectrum grids on the link ij, µ denotes a network-wide average risk value, and $R_e$ denotes a network-wide risk standard deviation.

Preferably, the determining positions of spectrum blocks according to the route selected and the allocated colors, to complete spectrum allocation is particularly: completing spectrum allocation according to the following formula:

q=0

FOR label=1:r if spectrum(1:l, label; (label+r))==0 spectrum(1:l, label: (label+r))=1 q=1 break if q==0 ratio=ratio+1 in the formula, q is an identification bit; q being 0 indicates that no spectrum has been successfully allocated; q being 1 indicates that a spectrum has been successfully allocated; label denotes a spectrum serial number; ratio denotes a blocking rate; spectrum denotes a spectrum matrix; r denotes the number of occupied spectrum grids; and l denotes an occupied link label.

Compared with the prior art, the present disclosure has the following beneficial effects: the present disclosure can reduce spectrum fragmentation and solve the problem in the prior art that the number of node switching hops and the network-wide risk balance cannot be comprehensively considered while spectrum utilization is improved.

DETAILED DESCRIPTION

The present disclosure is further described below with reference to the accompanying drawings and embodiments.

It should be noted that the following detailed descriptions are all illustrative and are intended to provide further clarification of this application. Unless otherwise specified, all technical and scientific terms used herein have the same meanings as normally understood by a person of ordinary skill in the art.

It is important to note that the terms used herein are intended only to describe specific embodiments and are not intended to limit exemplary embodiments according to this application. As used herein, the singular forms are also intended to include the plural forms as well, unless the context clearly indicates otherwise. In addition, it should also be understood that when the terms "include" and/or "comprise" are used in this specification, they indicate the presence of features, steps, operations, devices, components and/or their combinations.

Figure 1:
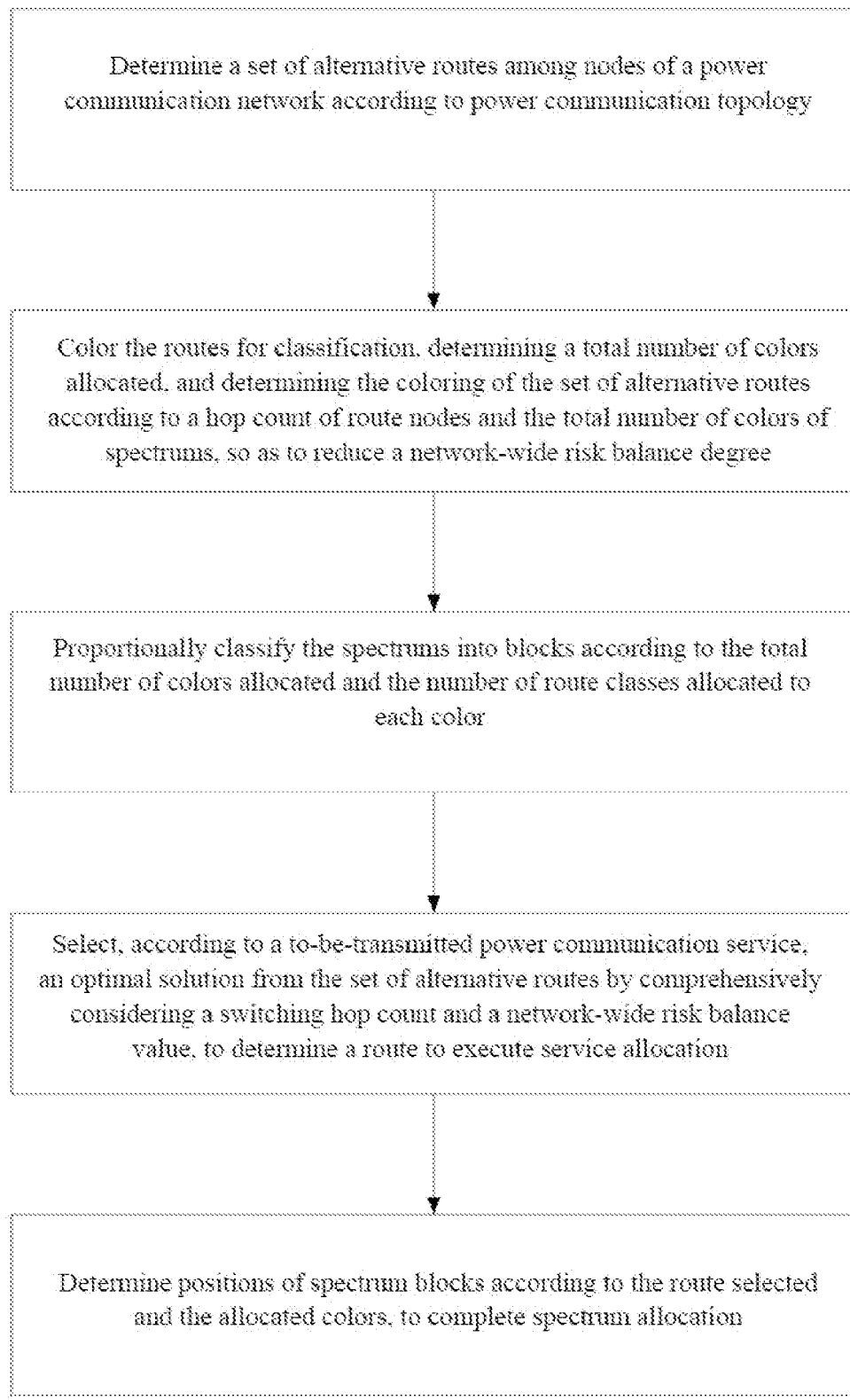
FIG. 1 is a schematic flowchart of a method according to an embodiment of the present disclosure.

As shown in FIG. 1, this embodiment provides a power optical transmission route and spectrum allocation method based on an elastic optical network, which can obtain, in route selection and calculation, a set of alternative routes according to a hop count index; and determine coloring of the set of alternative routes according to a hop count of route nodes and the total number of colors of spectrums, thereby reducing a network-wide risk balance degree and achieving a better spectrum allocation effect. Then, the network-wide risk balance degree is calculated, and a route is selected from the set of alternative routes by comprehensively considering a hop count of route nodes and the network-wide risk balance degree, to complete spectrum allocation.

The method particularly includes the following steps:

determining a set of alternative routes among nodes of a power communication network according to power communication topology;

coloring the routes for classification, determining a total number of colors allocated, and determining the coloring of the set of alternative routes according to a hop count of route nodes and the total number of colors of spectrums, so as to reduce a network-wide risk balance degree;

proportionally classifying the spectrums into blocks according to the total number of colors allocated and the number of route classes allocated to each color;

selecting, according to a to-be-transmitted power communication service, an optimal solution from the set of alternative routes by comprehensively considering a switching hop count and a network-wide risk balance value, to determine a route to execute service allocation; and determining positions of spectrum blocks according to the route selected and the allocated colors, to complete spectrum allocation.

In this embodiment, the determining a set of alternative routes among nodes of a power communication network according to power communication topology is particularly:

obtaining an undirected graph G=(V,E) according to topology of the power communication network, where V denotes a point set V={$v_1, v_2, v_3, \ldots, v_N$} of the power communication network, and E denotes an edge set E={$e_1, e_2, e_3, \ldots, e_m$} of the power communication network;

determining a switching hop count CAPEX of the $i^{th}$ route according to the point set and the edge set of the power communication network and the following formula:

$$CAPEX(i) = \sum^V p;$$

in the formula, p denotes the number of nodes that the route passes through; and determining a set of alternative routes of the $i^{th}$ node pair of the power communication network according to a switching hop count CAPEX. In particular, the set of alternative routes can be obtained according to a classical ksp, i.e. first k shortest paths, algorithm, by comparing a switching hop count to a link weight index.

In this embodiment, the determining the coloring of the set of alternative routes according to a hop count of route nodes and the total number of colors of spectrums, so as to reduce a network-wide risk balance degree is particularly:

establishing the following objective function according to a principle that the same links are in different colors or different links are in the same color:

Min Q=CAPEX+$N$;

in the formula, N is the total number of spectrum colors, Q is an optimal balance number; and CAPEX is a switching hop count of the route;

constraint conditions are:

$$\sum_{o \in O} x_v^o = 1, \ \forall \, v \in V_1;$$

$$x_v^o + x_{v'}^o \leq y_o, \ \forall \, (v, v') \in E_1, \ \forall \, o \in O;$$

$$y_o \geq y_{o'}, \ if\, o' \geq o, \ \forall \, o', o \in O;$$

$$y_o = \{0, 1\}, \ \forall \, o \in O;$$

$$x_v^o = \{0, 1\}, \ \forall \, v \in V_1, \ \forall \, o \in O;$$

$$N = \sum_{o \in O} y_o;$$

in the formula, p denotes the number of nodes that the route passes through, $V_1$ denotes a set of alternative routes in network topology, $E_1$ denotes a set of connection lines, 0 denotes a set of colors, o and o' denote a color respectively, which is represented by a color notation, and v and v' denote one of the route sets respectively; $x_v^o$ and $y_o$ are binary quantities respectively indicating whether a route uses a color, if the point v uses the color o, $x_v^o$=1, and otherwise, $x_v^o$=0; and if the color o has been used at least once, $y_o$=1, and otherwise, $y_o$=0.

In this embodiment, the proportionally classifying the spectrums into blocks according to the total number of colors allocated and the number of route classes allocated to each color is particularly:

determining a size of a spectrum block St(o) allocated to the $o^{th}$ color according to the following formula:

St(o)=ratio(o)×num; in the formula, num denotes the total number of spectrum grids, and ratio(o) denotes a ratio of the $o^{th}$ color; and classifying the spectrums into blocks according to a size ratio of the spectrum block allocated to each color.

In this embodiment, the selecting, according to a to-be-transmitted power communication service, an optimal solution from the set of alternative routes by comprehensively considering a switching hop count and a network-wide risk balance value is particularly:

selecting, according to the following objective function, the optimal solution from the set of alternative routes, and then determining the route to execute service allocation:

Min M=CAPEX $R_e$;

constraint functions are:

$$CAPEX = \sum^V p;$$

$$R(i, j) = n \times \frac{FS_{ij} - FS_{ij}^{idle}}{FS_{ij}} \times im;$$

$$\mu = \frac{1}{S} \sum R(i, j);$$

$$R_e = \sqrt{\frac{1}{S} \sum [R(i, j) - \mu]^{\wedge}2} \; ;$$

in the formula, M denotes an integrated optimization goal, CAPEX denotes a switching hop count of the $i^{th}$ route, V denotes a point set of the power communication network, im represents an initial failure rate probability, n represents service importance, p represents the number of nodes that the route passes through, R(i,j) represents an integrated risk value, N represents a variety of colors, S represents a set of network-side links, $FS_{ij}$ denotes the total number of spectrum grids on a link ij, $FS_{ij}^{idle}$ represents the number of idle spectrum grids on the link ij, μ denotes a network-wide average risk value, and $R_e$ denotes a network-wide risk standard deviation.

Preferably, in this embodiment, the determining positions of spectrum blocks according to the route selected and the allocated colors, to complete spectrum allocation is particularly: completing spectrum allocation according to the following formula:

q=0

FOR label=1:r if spectrum(1:l, label; (label+r))==0 spectrum(1:l, label: (label+r))=1 q=1 break if q==0 ratio=ratio+1 in the formula, q is an identification bit; q being 0 indicates that no spectrum has been successfully allocated; q being 1 indicates that a spectrum has been successfully allocated; label denotes a spectrum serial number; ratio denotes a blocking rate; spectrum denotes a spectrum matrix; r denotes the number of occupied spectrum grids; and 1 denotes an occupied link label.

Figure 2:
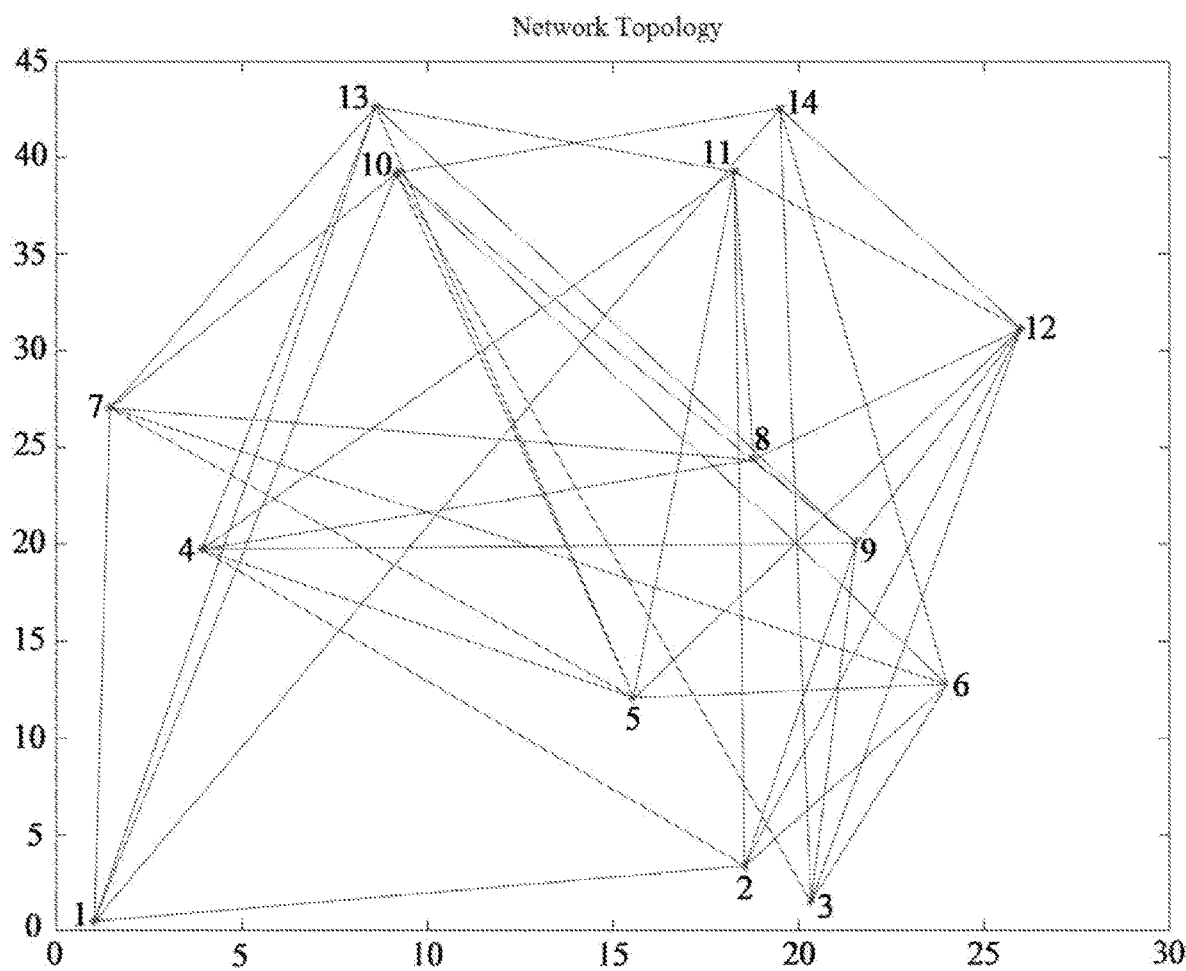
FIG. 2 is a schematic structural diagram of network topology according to an embodiment of the present disclosure.

In this embodiment, FIG. 2 is taken as a structural diagram of NSFNET network topology. There are totally 14 nodes and 48 links in FIG. 2. The importance of a service and the number of spectrum grids required follow even distribution of (1,5). A comparative algorithm is an optimal one for a route switching hop count, while an FF algorithm is used for a spectrum allocation algorithm. Averaging has been verified 100 times.

In order to prove the superiority of the embodiments of the present disclosure, in the embodiments of the present disclosure, a risk balance degree of a power communication network, an average service switching hop count, and a service blocking rate are selected as evaluation bases, and the average service switching hop count and a network-wide risk balance degree are integrated to investigate the rationality of resource allocation. At the same time, block allocation of spectrums is performed according to route coloring, which achieves effects of reducing a blocking rate and improving resource utilization.

Figure 3:
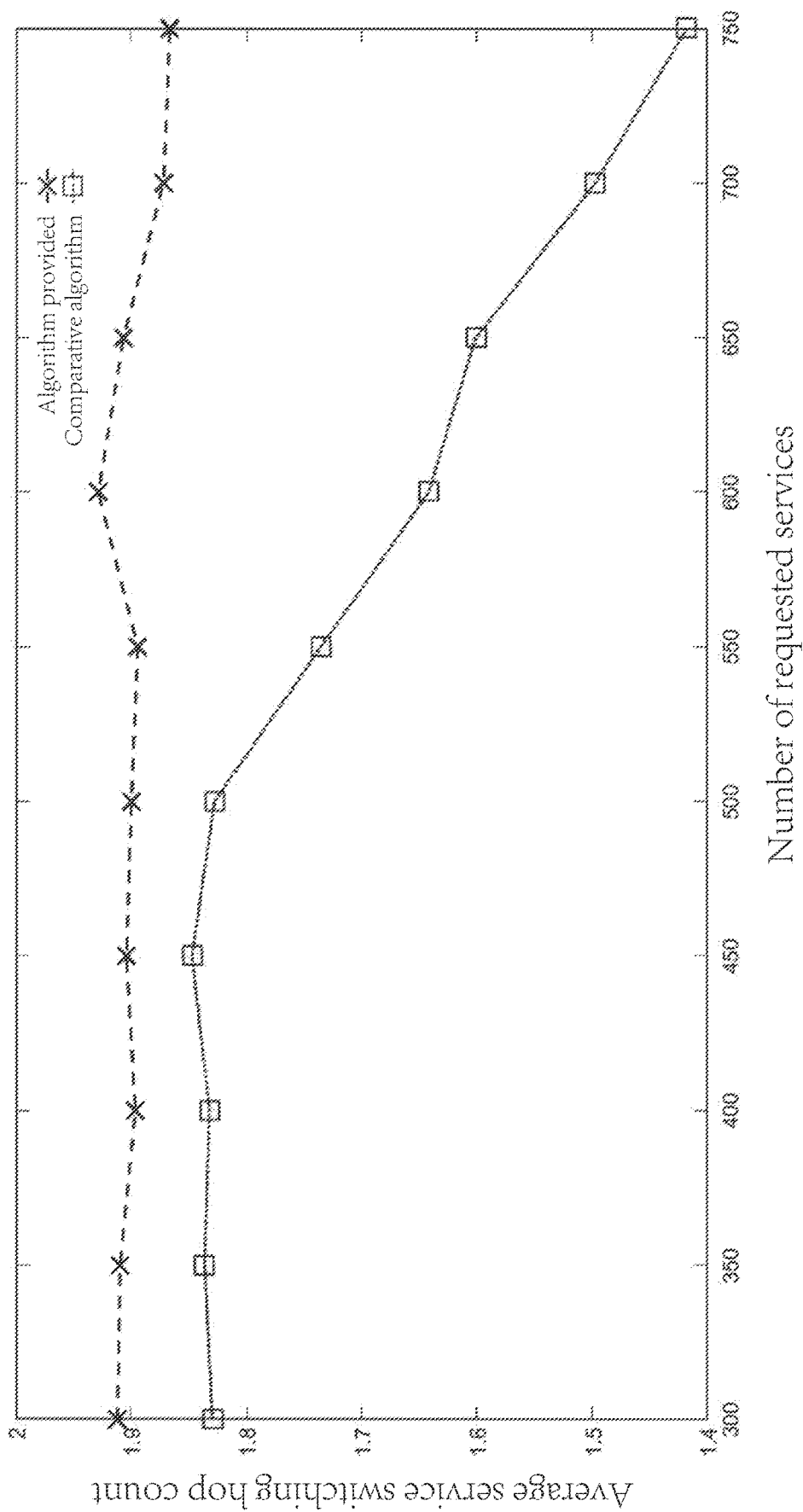
FIG. 3 is a schematic diagram of comparisons between average service switching hop counts in an embodiment of the present disclosure and in a comparative method.
Figure 4:
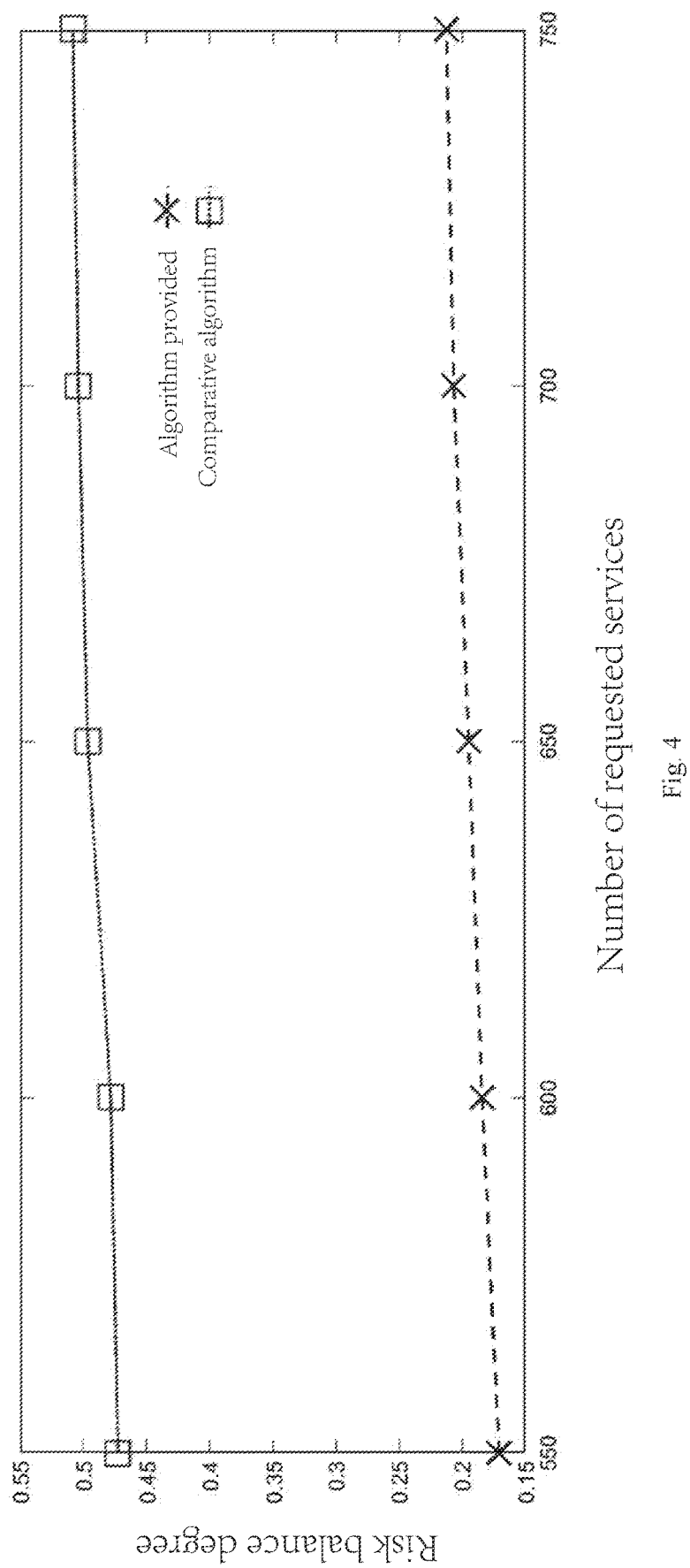
FIG. 4 is a schematic diagram of comparisons between network-wide risk balance degrees in an embodiment of the present disclosure and in a comparative method.
Figure 5:
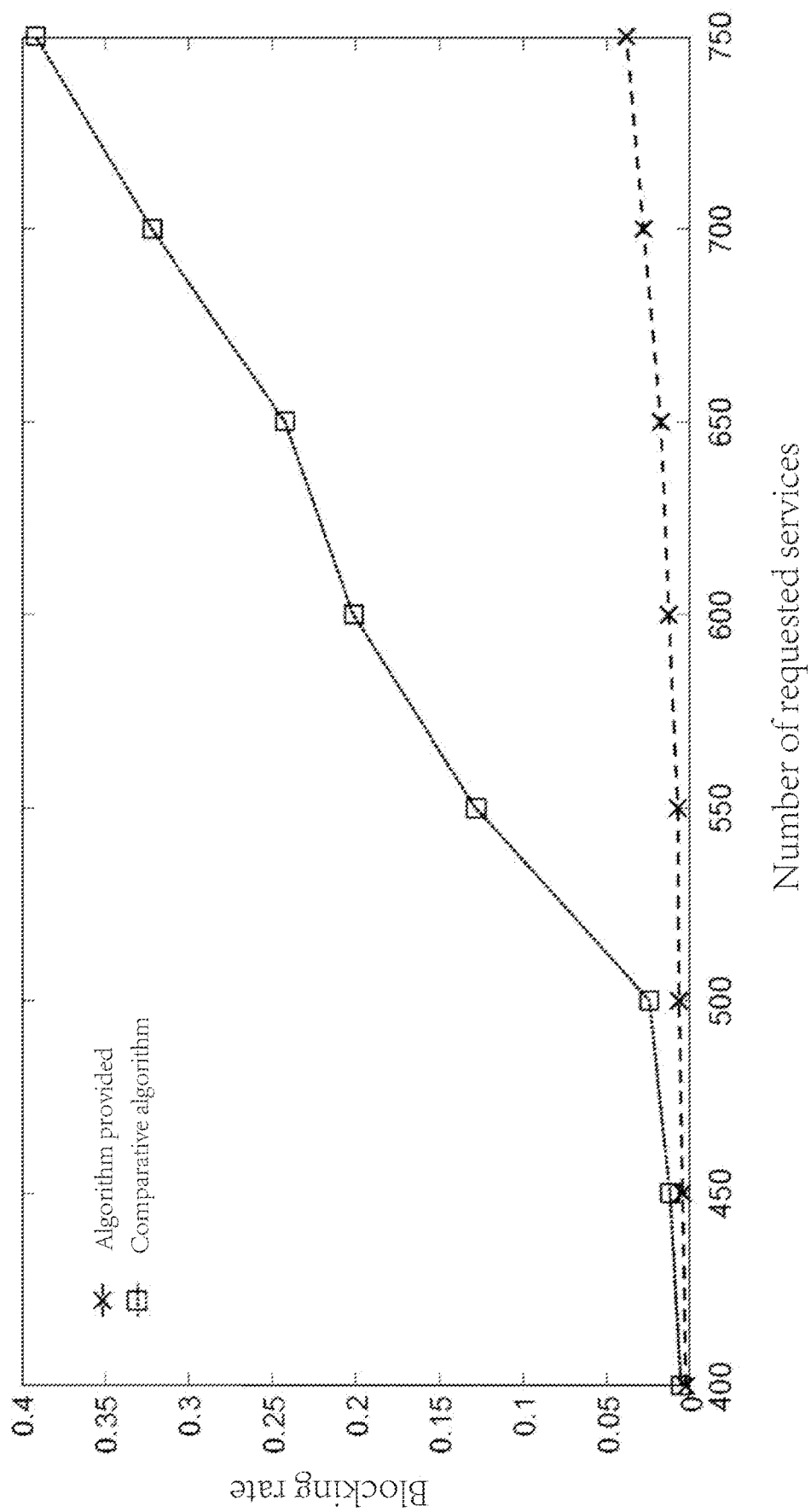
FIG. 5 is a schematic diagram of comparisons between service blocking rates in an embodiment of the present disclosure and in a comparative method.

FIGS. 3-5 illustrate results of comparisons between an algorithm as provided herein and a comparative algorithm. Proposed SA refers to the algorithm as provided herein, and FF refers to the comparative algorithm.

As can be seen from FIG. 3, when the number of services is small, the average service switching hop count of the master algorithm increases by only 3.7% to 4.4% compared with the comparative algorithm. When a network transmission traffic volume is large and the number of services is large, the blocking rate of the comparative algorithm is increased, resulting in the decrease of the average service switching hop count.

As can be seen from FIG. 4, compared with the previous switching hop index, the algorithm as provided herein is slightly 3.7% to 4.4% higher than the comparative algorithm. However, in terms of the network-wide risk balance degree, the algorithm as provided herein decreases by about 60% compared with the comparative algorithm. The effect is obvious.

As can be seen from FIG. 5, when the number of services is small, the blocking rates of the two algorithms are similar, and when the number of services is large, especially when it is over 500, the blocking rates of the comparative algorithm rises sharply. However, the algorithm as provided herein shows better performance.

A person skilled in the art should understand that the embodiments of this application may be provided as a method, a system, or a computer program product. Therefore, this application may be in the form of a complete hardware embodiment, a complete software embodiment, or an embodiment combining software and hardware. Moreover, this specification can be in the form of a computer program product implemented on one or more computer-usable storage media (including, but not limited to, a magnetic disk memory, a CD-ROM, an optical memory, and the like) including computer-usable program code.

This application is described with reference to flowcharts and/or block diagrams of the method, the device (system), and the computer program product according to the embodiments of this application. It should be understood that computer program instructions may be used to implement each process and/or block in the flowcharts and/or block diagrams and combinations of processes and/or blocks in the flowcharts and/or block diagrams. The computer program instructions may be provided to a general-purpose computer, a special-purpose computer, an embedded processor or a processor of another programmable data processing device to generate a machine, such that the computer or the processor of another programmable data processing device executes instructions to generate an apparatus configured to implement functions designated in one or more processes in a flowchart and/or one or more blocks in a block diagram.

The computer program instructions may also be stored in a computer-readable memory that can guide the computer or another programmable data processing device to work in a specific manner, such that the instructions stored in the computer-readable memory generates an article of manufacture including an instruction apparatus, and the instruction apparatus implements functions designated by one or more processes in a flowchart and/or one or more blocks in a block diagram.

The computer program instructions may also be installed in the computer or another programmable data processing device, such that a series of operation steps are executed on the computer or another programmable device to generate a computer implemented processing, and therefore, the instructions executed in the computer or another programmable terminal device provide steps for implementing functions designated in one or more processes in a flowchart and/or one or more blocks in a block diagram.

The above are merely preferred embodiments of the present disclosure, and are not limitations on other forms of the present disclosure. Any person skilled in the art can change or modify the technical contents disclosed above into equally varying equivalent embodiments. However, any simple alterations, equivalent changes and modifications made to the above embodiments according to the technical essence of the present disclosure without departing from the contents of the technical solutions of the present disclosure still come within the protection scope of the technical solutions of the present disclosure.

The invention claimed is:

1. A power optical transmission route and spectrum allocation method based on an elastic optical network, comprising the following steps:
  determining a set of alternative routes among nodes of a power communication network according to power communication topology;
  coloring the routes for classification, determining a total number of colors allocated, and determining the coloring of the set of alternative routes according to a hop count of route nodes and the total number of colors of spectrums, so as to reduce a network-wide risk balance degree;
  proportionally classifying the spectrums into blocks according to the total number of colors allocated and the number of route classes allocated to each color;
  selecting, according to a to-be-transmitted power communication service, an optimal solution from the set of alternative routes by comprehensively considering a switching hop count and a network-wide risk balance value, to determine a route to execute service allocation; and
  determining positions of spectrum blocks according to the route selected and the allocated colors, to complete spectrum allocation;
  wherein the determining a set of alternative routes among nodes of a power communication network according to power communication topology is particularly:
  obtaining an undirected graph G=(V,E) according to topology of the power communication network, where V denotes a point set V={$v_1, v_2, v_3, \ldots, v_N$} of the power communication network, and E denotes an edge set E={$e_1, e_2, e_3, \ldots, e_m$} of the power communication network;
  determining a switching hop count CAPEX of the $i^{th}$ route according to the point set and the edge set of the power communication network and the following formula:

$$CAPEX(i) = \sum^V p;$$

in the formula, p denotes the number of nodes that the route passes through; and
  determining a set of alternative routes of the $i^{th}$ node pair of the power communication network according to a switching hop count CAPEX;
  wherein the selecting, according to a to-be-transmitted power communication service, an optimal solution from the set of alternative routes by comprehensively considering a switching hop count and a network-wide risk balance value is particularly:
  selecting, according to the following objective function, the optimal solution from the set of alternative routes, and then determining the route to execute service allocation:

Min $M$=CAPEX+$R_e$;

constraint functions are:

$$CAPEX = \sum^V p;$$

$$R(i, j) = n \times \frac{FS_{ij} - FS_{ij}^{idle}}{FS_{ij}} \times im;$$

$$\mu = \frac{1}{S}\sum R(i, j);$$

$$R_e = \sqrt{\frac{1}{S}\sum [R(i, j) - \mu]^{\wedge}2};$$

in the formula, M denotes an integrated optimization goal, CAPEX denotes a switching hop count of the $i^{th}$ route, V denotes a point set of the power communication network, im represents an initial failure rate probability, n represents service importance, p represents the number of nodes that the route passes through, R(i,j) represents an integrated risk value, N represents a variety of colors, S represents a set of network-side links, $FS_{ij}$ denotes the total number of spectrum grids on a link ij, $FS_{ij}^{idle}$ represents the number of idle spectrum grids on the link ij, μ denotes a network-wide average risk value, and $R_e$ denotes a network-wide risk standard deviation.

2. The power optical transmission route and spectrum allocation method based on an elastic optical network according to claim 1, wherein the determining the coloring of the set of alternative routes according to a hop count of route nodes and the total number of colors of spectrums, so as to reduce a network-wide risk balance degree is particularly:
  establishing the following objective function according to a principle that the same links are in different colors or different links are in the same color:

Min $Q$=CAPEX+$N$;

in the formula, N is the total number of spectrum colors, Q is an optimal balance number; and
CAPEX is a switching hop count of the route;
constraint conditions are:

$$\sum_{o \in O} x_v^o = 1, \ \forall v \in V_1;$$

$$x_v^o + x_{v'}^o \leq y_o, \ \forall (v, v') \in E_1, \ \forall o \in O;$$

$$y_o \geq y_{o'}, \ if o' \geq o, \ \forall o', o \in O;$$

$$y_o = \{0, 1\}, \ \forall o \in O;$$

$$x_v^o = \{0, 1\}, \ \forall v \in V_1, \ \forall o \in O;$$

$$N = \sum_{o \in O} y_o;$$

in the formula, p denotes the number of nodes that the route passes through, $V_1$ denotes a set of alternative routes in network topology, $E_1$ denotes a set of connection lines, O denotes a set of colors, o and o' denote a color respectively, and v and v' denote one of the route sets respectively; $x^o_v$ and $y_o$ are binary quantities, if the point v uses the color o, $x^o_v=1$ and otherwise, $x^o_v=0$ and if the color o has been used at least once, $y_o=1$, and otherwise, $y_o=0$.

3. The power optical transmission route and spectrum allocation method based on an elastic optical network according to claim 1, wherein the proportionally classifying the spectrums into blocks according to the total number of colors allocated and the number of route classes allocated to each color is particularly:

determining a size of a spectrum block St(o) allocated to the $o^{th}$ color according to the following formula:

$$St(o)=\text{ratio}(o)\times\text{num};$$

in the formula, num denotes the total number of spectrum grids, and ratio(o) denotes a ratio of the $o^{th}$ color; and classifying the spectrums into blocks according to a size ratio of the spectrum block allocated to each color.

\* \* \* \* \*